(12) United States Patent
Lake et al.

(10) Patent No.: US 7,845,540 B2
(45) Date of Patent: Dec. 7, 2010

(54) SYSTEMS AND METHODS FOR DEPOSITING CONDUCTIVE MATERIAL INTO OPENINGS IN MICROFEATURE WORKPIECES

(75) Inventors: Rick C. Lake, Meridian, ID (US); Ross S. Dando, Nampa, ID (US)

(73) Assignee: Micron Technology, Inc., Boise, ID (US)

(*) Notice: Subject to any disclaimer, the term of this patent is extended or adjusted under 35 U.S.C. 154(b) by 1027 days.

(21) Appl. No.: 11/215,214

(22) Filed: Aug. 30, 2005

(65) Prior Publication Data

US 2007/0057028 A1 Mar. 15, 2007

(51) Int. Cl.
 *B23K 1/18* (2006.01)
 *B23K 31/02* (2006.01)

(52) U.S. Cl. .......... 228/40; 228/218; 228/259

(58) Field of Classification Search .......... 228/40, 228/218, 259; 427/471, 498, 512, 594, 601, 427/96.9, 99.5, 97.9
See application file for complete search history.

(56) References Cited

U.S. PATENT DOCUMENTS

| | | | |
|---|---|---|---|
| 2,821,959 A | | 2/1958 | Franz |
| 3,006,318 A | | 10/1961 | Monroe, Jr. et al. |
| 3,865,298 A | * | 2/1975 | Allen et al. .......... 118/63 |
| 4,301,771 A | * | 11/1981 | Jukkola et al. .......... 122/4 D |
| 4,706,602 A | * | 11/1987 | Polacek .......... 118/63 |
| 4,799,616 A | * | 1/1989 | Simpson et al. .......... 228/125 |
| 5,043,299 A | * | 8/1991 | Chang et al. .......... 438/674 |
| 5,110,036 A | * | 5/1992 | Parker, Jr. .......... 228/256 |
| 5,755,888 A | * | 5/1998 | Torii et al. .......... 118/719 |
| 6,342,104 B1 | * | 1/2002 | Kamikawa et al. .......... 134/26 |
| 6,708,872 B2 | | 3/2004 | Gruber et al. |
| 6,796,483 B1 | * | 9/2004 | Weber et al. .......... 228/219 |
| 6,910,487 B2 | * | 6/2005 | Mertens et al. .......... 134/95.2 |
| 6,923,117 B1 | | 8/2005 | Onishi et al. |
| 2004/0050408 A1 | * | 3/2004 | Christenson et al. .......... 134/184 |

FOREIGN PATENT DOCUMENTS

| | | |
|---|---|---|
| CA | 2083135 | 5/1991 |
| TW | 171536 | 10/1991 |
| TW | 174529 | 12/1991 |
| TW | 556254 | 10/2003 |

OTHER PUBLICATIONS

Yamamoto, S. et al., "Si Through-Hole Interconnections Filled with Au-Sn Solder by Molten Metal Suction Method," pp. 642-645, IEEE, MEMS-03 Kyoto, The Sixteenth Annual International Conference on Micro Electro Mechanical Systems, Jan. 2003, ISBN 0-7803-7744-3.
International Search Report and Written Opinion for International Application No. PCT/US2006/031309, 10 pages, mailed Jan. 15, 2007.
Office Action (translation) issued Nov. 20, 2008 in R.O.C. (Taiwan) Application No. 095131076.
Office Action (translation) issued Aug. 27, 2010 in R.O.C. (Taiwan) Application No. 095131076.

* cited by examiner

*Primary Examiner*—Roy King
*Assistant Examiner*—Michael Aboagye
(74) *Attorney, Agent, or Firm*—Perkins Coie LLP (57) ABSTRACT

Systems and methods for depositing conductive material into openings in microfeature workpieces are disclosed herein. One particular embodiment of a system for processing microfeature workpieces includes a processing chamber and a solder reservoir in the processing chamber. The solder reservoir includes a slot having a generally vertical orientation positioned to receive a microfeature workpiece. In several embodiments, the system can further include a conductive material at least partially filling the slot.

17 Claims, 5 Drawing Sheets

SYSTEMS AND METHODS FOR DEPOSITING CONDUCTIVE MATERIAL INTO OPENINGS IN MICROFEATURE WORKPIECES

TECHNICAL FIELD

The present invention is directed to systems and methods for depositing conductive material into openings in microfeature workpieces.

BACKGROUND

Microelectronic devices, micromechanical devices, and other devices with microfeatures are typically formed by constructing several layers of components on a workpiece. In the case of microelectronic devices, a plurality of dies are fabricated on a single workpiece, and each die generally includes an integrated circuit and a plurality of bond-pads coupled to the integrated circuit. The dies are separated from each other and packaged to form individual microelectronic devices that can be attached to modules or installed in other products.

One aspect of fabricating and packaging such dies is forming interconnects that electrically couple conductive components located in different layers. In some applications, it may be desirable to form interconnects that extend completely through the dies or through a significant portion of the dies. Such interconnects electrically couple bond-pads or other conductive elements proximate to one side of the dies to conductive elements proximate to the other side of the dies. Through-wafer interconnects, for example, are constructed by forming deep vias on the front side and/or backside of the workpiece and in alignment with corresponding bond-pads at the front side of the workpiece. The vias are often blind vias in that they are closed at one end. The blind vias are then filled with a conductive fill material (e.g., by immersing the workpiece into a solder bath). After further processing, the workpiece can be thinned to reduce the thickness of the final dies. Solder balls or other external electrical contacts are subsequently attached to the through-wafer interconnects at the backside and/or the front side of the workpiece. The solder balls or external contacts can be attached either before or after singulating the dies from the workpiece.

Figure 1:
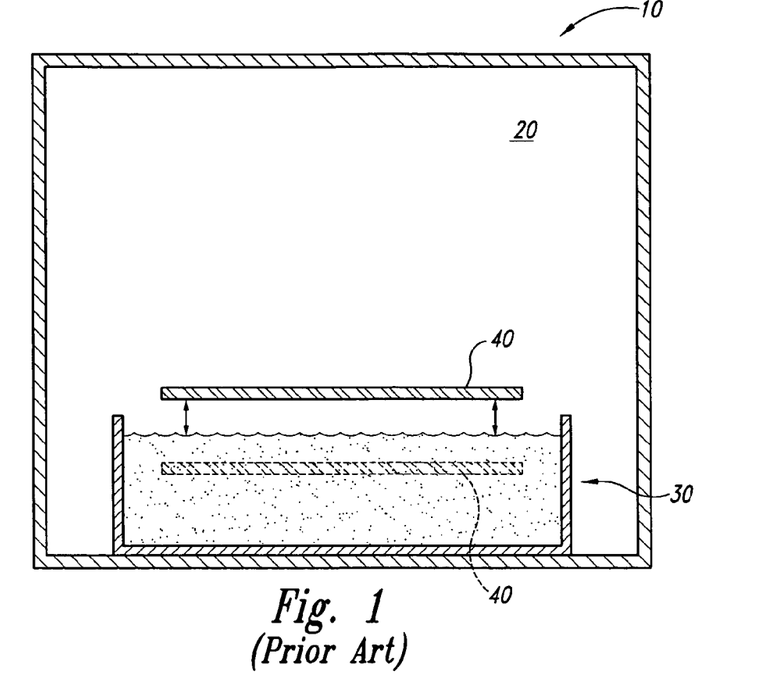
FIG. 1 is a partially schematic side cross-sectional view of a system for depositing solder into openings in microfeature workpieces in accordance with the prior art.

FIG. 1 is a partially schematic side cross-sectional view of a conventional system 10 for depositing solder into openings in a microfeature workpiece. The system 10 can include a chamber 20, a solder bath 30, and a workpiece 40 in the chamber 20 for processing. The solder bath 30 is generally a flat, open reservoir of molten solder or conductive material. The size of the solder bath 30 generally corresponds to the size of the workpiece 40 so that the workpiece can be completely immersed within the solder bath 30 during processing. In one embodiment, for example, the solder bath 30 can include a relatively large and deep container (e.g., about 9 inches by 9 inches by 0.75 inches) filled with AuSn solder (i.e., solder including about 80 percent gold and 20 percent tin). The workpiece 40 can include a plurality of openings or vias (not shown) extending at least partially through the workpiece 40. As discussed below, the openings are at least partially filled with solder from the solder bath 30.

In operation, the workpiece 40 is positioned within the chamber 20 above the solder bath 30 and air or other gases within the chamber 20 are exhausted to create a vacuum within the chamber 20. The workpiece 40 is then at least partially immersed into the solder bath 30 (as shown in broken lines). The chamber 20 is then pressurized to a desired pressure (e.g., using nitrogen ($N_2$) gas) and the differential pressure between the inside of the chamber 20 and the inside of the openings within the workpiece 40 causes the solder in the solder bath 30 to be sucked into the openings in the workpiece 40. The workpiece 40 is then removed from the solder bath 30 and cooled. The workpiece 40 can then be removed from the chamber 20 for further processing.

Conventional systems for depositing conductive material into openings in workpieces, such as the solder bath 30 of the system 10, include several drawbacks. One drawback with the system 10 is that it can be very expensive to keep the solder bath 30 full of solder. In embodiments using AuSn solder, for example, it can cost well over $100,000 to keep an adequate volume of solder in the solder bath 30 for processing the workpiece 40. Because the openings in the workpiece 40 are extremely small and filling the openings requires very little solder material, much of the solder within the solder bath 30 can go to waste after processing.

Another drawback with the conventional approach described above is the large exposed surface area of the workpiece 40 as the workpiece is removed from the solder bath 30. Dross begins to form on the workpiece 40 almost immediately after the workpiece 40 is removed from the solder bath 30. This oxidation can require additional processing steps for removal and/or cause contamination or defects in the workpiece 40. Still another drawback with the conventional approach described above is that the workpiece 40 is relatively buoyant within the solder bath 30 and it can be difficult to completely cover the workpiece 40 with solder. As a result, the solder may not completely fill the openings and/or the solder may not be distributed uniformly across the workpiece 40. Accordingly, there is a need to improve the system and methods for depositing solder or other conductive materials into openings in microfeature workpieces.

DETAILED DESCRIPTION

A. Overview/Summary

The present invention is directed to systems and methods for depositing conductive material into openings in microfeature workpieces. One particular embodiment of a system for processing microfeature workpieces includes a processing chamber and a solder reservoir in the processing chamber. The solder reservoir includes a slot having a generally vertical orientation positioned to receive a microfeature workpiece. In several embodiments, the system can further include a conductive material at least partially filling the slot.

Another embodiment of a system for depositing conductive material into openings in microfeature workpieces can include a transfer chamber having a first opening and a second opening, and a processing chamber adjacent to the transfer chamber and in communication with the first opening. The system also includes a first door positioned to sealably close the first opening and a second door positioned to sealably close the second opening. The system can further include (a) a vacuum pump coupled to the transfer chamber and the processing chamber, and (b) a gas supply coupled to the transfer chamber and the processing chamber. The vacuum pump is configured to exhaust ambient gas from the transfer chamber and the processing chamber to create a vacuum within the transfer chamber and the processing chamber, respectively. The gas supply is configured to deliver an inert gas into the transfer chamber and the processing chamber to increase the pressure in the transfer chamber and the processing chamber, respectively, from a first pressure to a second pressure greater than the first pressure. The system also includes a solder reservoir in the second chamber. The solder reservoir can include a base portion and a slot extending at least partially through the base portion. The slot has a generally vertical orientation and is positioned to receive a microfeature workpiece. The system also includes a conductive material at least partially filling the slot.

Still another aspect of the invention is directed to a method for processing microfeature workpieces in a processing chamber. The method includes moving a leading edge of a microfeature workpiece into a slot in a solder reservoir. The slot includes a generally vertical orientation and the workpiece is moved into the slot until the workpiece is at least partially immersed in a conductive material within the slot. The method also includes increasing an ambient pressure within the processing chamber from a first pressure to a second pressure higher than the first pressure to at least partially fill a plurality of openings in the workpiece with the conductive material.

The term "microfeature workpiece" is used throughout to include substrates upon which and/or in which microelectronic devices, micromechanical devices, data storage elements or layers, vias or conductive lines, micro-optic features, micromechanical features, and/or microbiological features are or can be fabricated. For example, microfeature workpieces can be semiconductor wafers, such as silicon or gallium arsenide wafers, glass substrates, insulative substrates, and many other types of materials. The term "gas" is used throughout to include any form of matter that has no fixed shape and will conform in volume to the space available, which specifically includes vapors (i.e., a gas having a temperature less than the critical temperature so that it may be liquefied or solidified by compression at a constant temperature). Many specific details of certain embodiments of the invention are set forth in the following description and in FIGS. 2A-3 to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of features are not precluded.

B. Embodiments of Systems and Methods for Depositing Conductive Material Into Openings in Microfeature Workpieces FIGS. 2A-2H illustrate various stages in a method for depositing conductive material into openings in microfeature workpieces in accordance with an embodiment of the invention. More specifically, FIGS. 2A-2H are side cross-sectional views illustrating a system 200 including a solder reservoir 230 for depositing solder or other conductive materials into openings (not shown) in a microfeature workpiece W. Compared with conventional solder bath systems described above with respect to FIG. 1, several embodiments of the system 200 are expected to (a) substantially reduce the required volume of solder or conductive material within the system 200, and (b) significantly reduce the exposed surface area of the workpiece W after removal from the solder reservoir 230 and, accordingly, reduce dross and/or oxidation of the workpiece W.

Figure 2A:
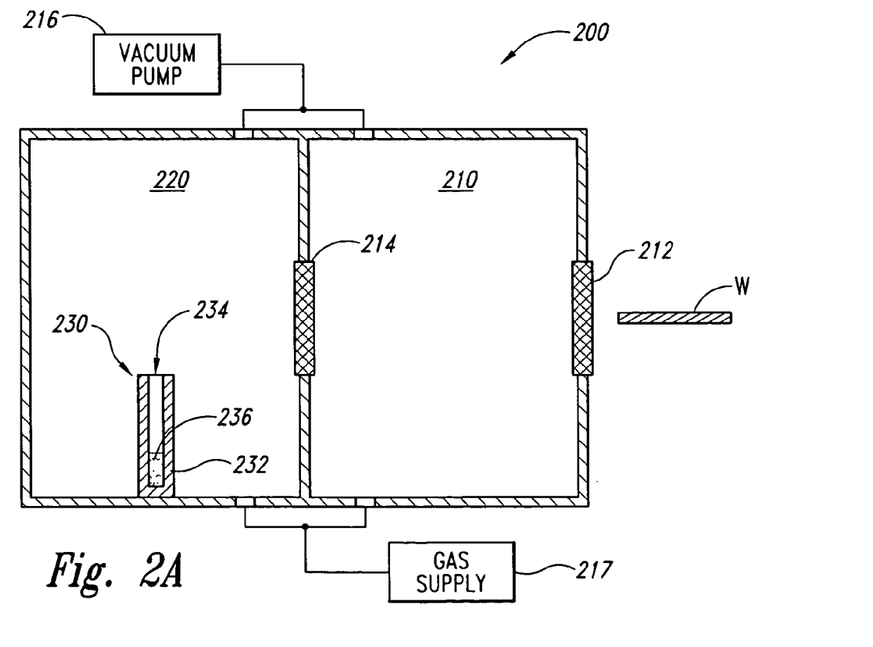
FIGS. 2A-2H illustrate various stages in a method for depositing a conductive material into openings in a microfeature workpiece in accordance with one embodiment of the invention.

FIG. 2A is a partially schematic, cross-sectional view of the system 200 at an initial stage before the workpiece W has been introduced into the system 200. The system 200 can include a first chamber 210 (e.g., a transfer or load lock chamber) and a second chamber 220 (e.g., a processing chamber) adjacent to the first chamber 210. The first chamber 210 is configured to isolate the workpiece W from an outside environment before the workpiece W is transferred to the second chamber 220 for processing. The first chamber 210 can include a first door 212 separating the first chamber 210 from the outside environment and a second door 214 separating the first chamber 210 from the second chamber 220. As described in greater detail below, the first and second doors 212 and 214 are movable to provide ingression to and egression from the first and second chambers 210 and 220 for the workpiece W. The first and second chambers 210 and 220 can be sized to accommodate a wide variety of different workpieces that may be used within the system 200. In other embodiments, the first and second chambers 210 and 220 can have a different orientation with respect to each other and/or a different configuration. The system 200 also includes a vacuum pump 216 and a gas supply 217 operably coupled to the first and second chambers 210 and 220 to control the pressure within the respective chambers (e.g., by exhausting and/or delivering gases to the first and second chambers 210 and 220).

The system 200 further includes a solder reservoir or receptacle 230 within the second chamber 220. The solder reservoir 230 includes a base portion 232 and a slot 234 (i.e., a slit or groove) extending at least partially through the base portion 232. A conductive material (e.g., solder) 236 at least partially fills the slot 234. The slot 234 is configured to receive the workpiece W as the workpiece is at least partially immersed in the conductive material 236 for processing. The solder reservoir 230 differs from the conventional solder bath 30 described above with respect to FIG. 1 in that the slot 234 has a generally vertical orientation. The slot 234 is accordingly one embodiment of a vertical container (e.g., a well) having a width substantially less than its depth. Accordingly, the workpiece W also includes a generally vertically orientation as the workpiece W is moved into the slot 234 (as described in greater detail below with respect to FIGS. 2D-2G), as opposed to the generally horizontal orientation of the workpiece 40 immersed in the solder bath 30.

The conductive material 236 within the slot 234 can include solder materials (e.g., AuSn solder), solder alloys, or other suitable conductive materials having lower melting points than silicon. One feature of the solder reservoir 230 is that the slot 234 only needs to be partially filled with the conductive material 236 because, as described in greater detail below with respect to FIG. 2F, the workpiece W will displace the conductive material 236 within the slot 234 such that the conductive material 236 at least partially covers the major surfaces of the workpiece W.

Figure 2B:
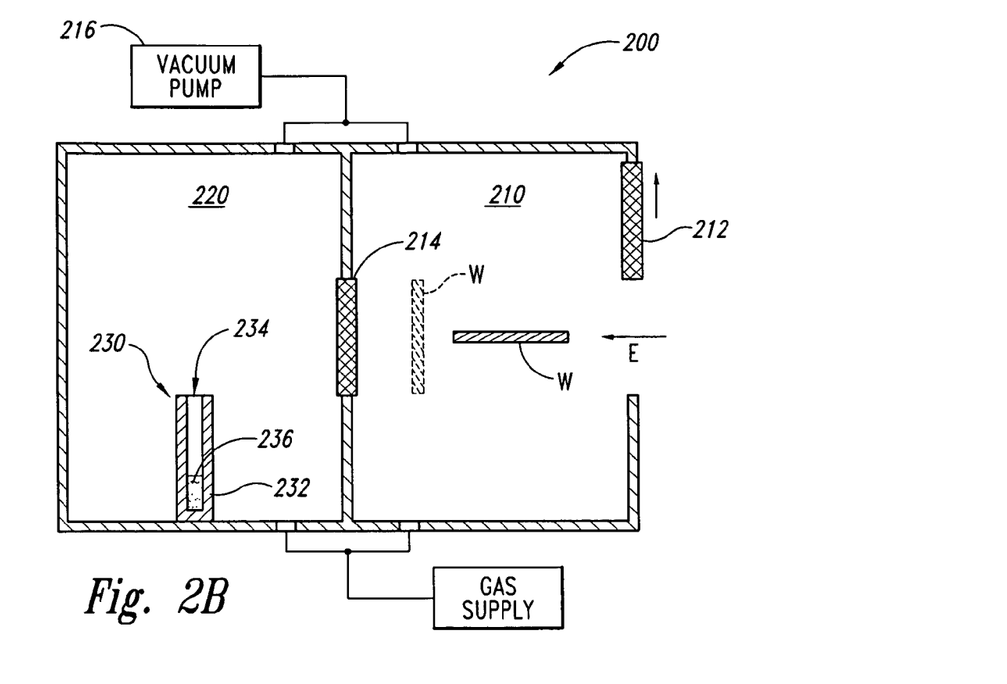

Referring next to FIG. 2B, the first door 212 to the first chamber 210 is opened and the workpiece W is moved to a first position within the first chamber 210 (as shown by the arrow E) using a suitable transfer mechanism (not shown). The workpiece W can have several different orientations within the first chamber 210. For example, the workpiece W can be oriented generally horizontally (as shown in solid lines) or generally vertically (as shown in broken lines) with respect to the first chamber 210. In additional embodiments, the workpiece W can have other orientations.

Figure 2C:
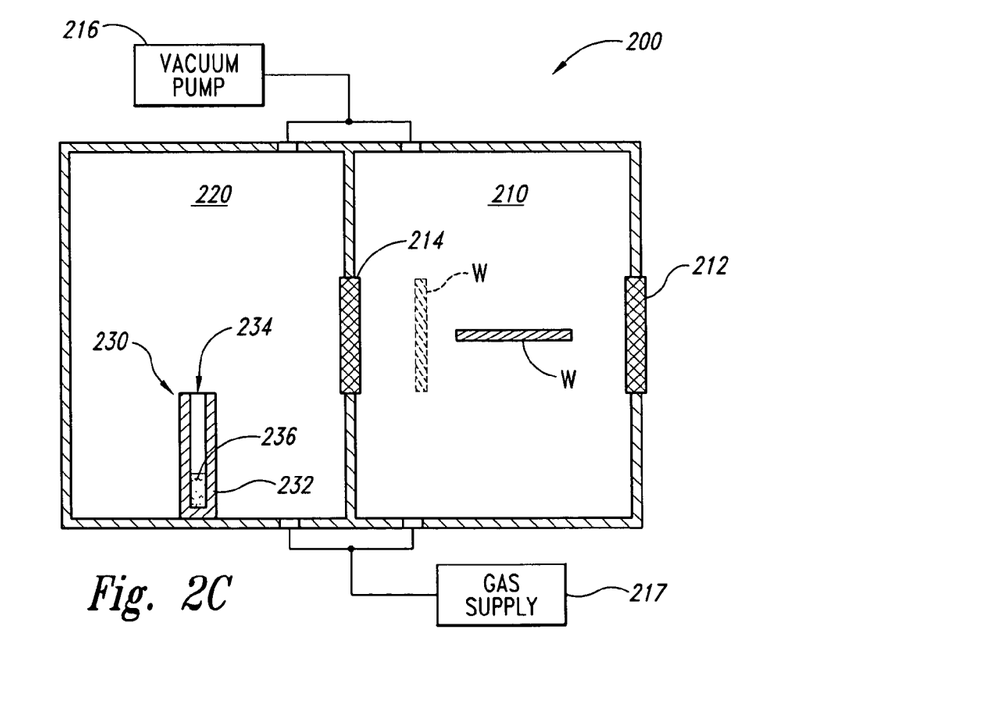

Referring next to FIG. 2C, the first door 212 is closed after the workpiece W is moved to the first position and the vacuum pump 216 exhausts or otherwise removes ambient gas within the first chamber 210 to create a vacuum in the first chamber 210. The gas supply 217 then delivers an inert gas (e.g., $N_2$ gas) into the first chamber 210 to increase the pressure in the first chamber 210 to a desired pressure. In other embodiments, other suitable inert gases can be used. The exhausting/delivering steps can be repeated any number of times to achieve a generally oxygen-free environment within the first chamber 210. In this way, the first chamber 210 acts as a buffer or entry chamber to prevent contamination of the environment within the second chamber 220 such that the first chamber 210 and the second chamber 220 both have a generally oxygen-free environment while processing the workpiece.

Figure 2D:
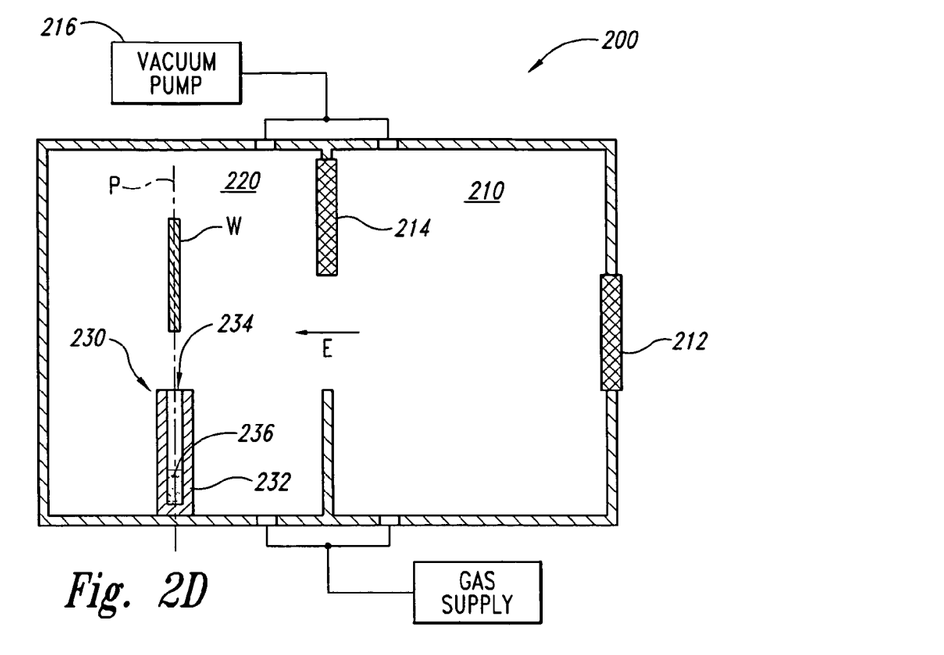
Figure 2E:
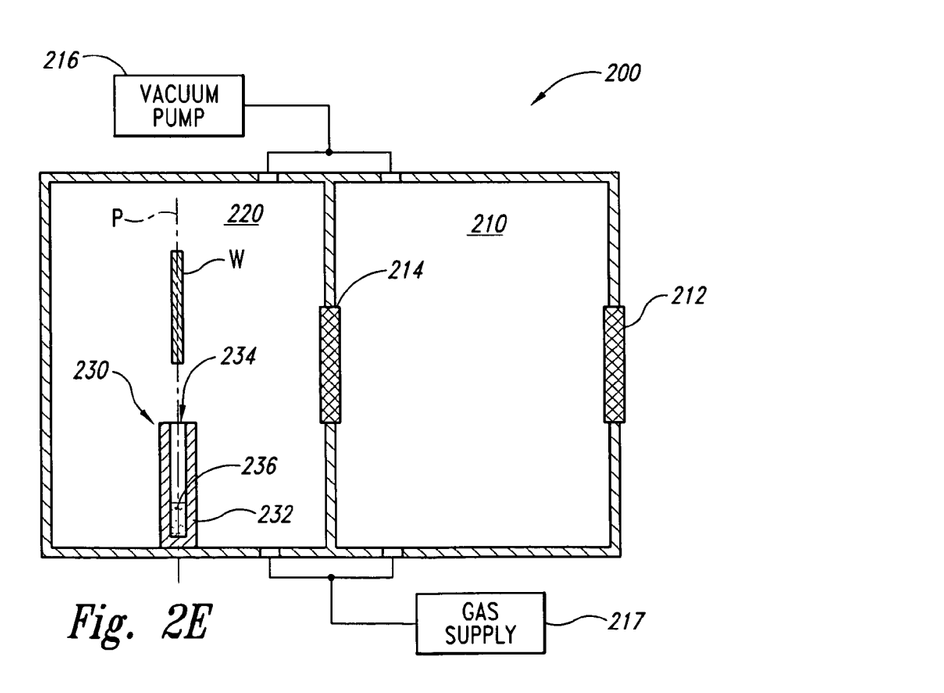

Referring next to FIG. 2D, the second door 214 is opened (after creating a generally oxygen-free environment in the first chamber 210) and the workpiece W is moved (as shown by the arrow E) to a second position within the second chamber 220. In the illustrated embodiment, for example, the workpiece W is moved to a second position generally aligned with the slot 234 of the solder reservoir 230 along a processing axis P. In other embodiments, the workpiece W can be at a different position and/or orientation with respect to the slot 234 and/or the solder reservoir 230. Referring next to FIG. 2E, the second door 214 is closed and the vacuum pump 216 exhausts or otherwise removes the ambient gas within the second chamber 220 to create a vacuum in the second chamber 220.

Figure 2F:
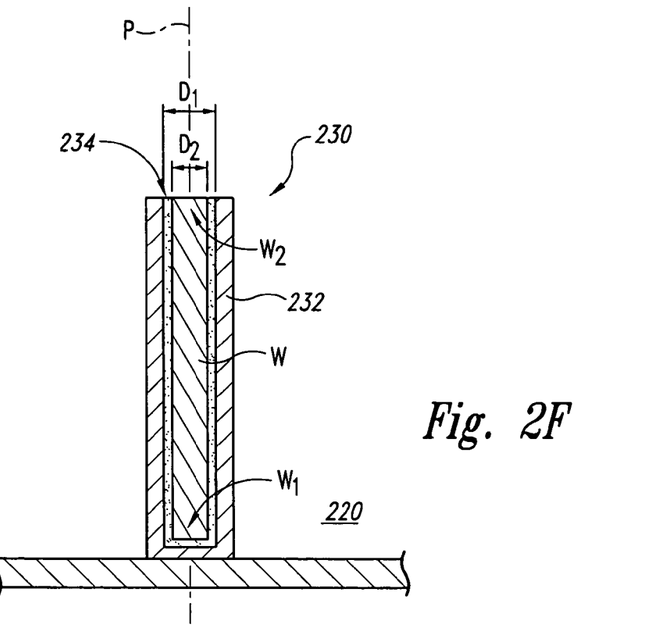

The workpiece W is then moved along the processing axis P into the slot 234 of the solder reservoir 230 for processing. FIG. 2F, more specifically, is an enlarged side cross-sectional view of the workpiece W at least partially immersed in the conductive material 236 within the slot 234. A first or leading edge portion $W_1$ of the workpiece W is proximate a bottom portion of the slot 234 and a second or trailing edge portion $W_2$ of the workpiece W is proximate a top portion of the slot 234. The slot 234 can have a width $D_1$ that is greater than a thickness $D_2$ of the workpiece W. Accordingly, the workpiece W can fit within the slot 234 with sufficient clearance between the workpiece W and the sidewalls of the slot 234 for the conductive material 236 to generally cover the major surfaces of the workpiece W. In other embodiments, the width $D_1$ of the slot 234 and/or the thickness $D_2$ of the workpiece W can be different or have a different ratio with respect to each other. In still further embodiments, the workpiece W may be positioned differently within the slot 234. For example, the workpiece W may be positioned flush against one sidewall of the slot 234 or the workpiece W may be positioned off-center within the slot 234 such that one side of the workpiece W has more clearance than the other.

After immersing the workpiece W within the conductive material 236 in the solder reservoir 230, the gas supply 217 can deliver an inert gas (e.g., $N_2$ gas) into the second chamber 220 to increase the pressure within the second chamber 220 to a desired pressure (e.g., atmospheric pressure). In several embodiments, the second chamber 220 can be "overpressurized" (i.e., the pressure can be greater than atmospheric pressure). Increasing the pressure in the second chamber 220 creates a pressure differential between the inside of the second chamber 220 and the inside of the openings (e.g., blind holes or blind vias) in the workpiece W, thereby forcing the conductive material 236 into the openings to at least partially fill the openings in the workpiece W. For purposes of this specification, a "blind hole" or "blind via" refers to a hole or aperture that extends only partially through a material or is otherwise closed at one end.

In several embodiments, the solder reservoir 230 and/or the workpiece W can be agitated (e.g., using ultrasonics or a sonic wave) after immersion to impart some vibration or movement to the solder reservoir 230 and/or the workpiece W to further expel any trapped air within the openings. In some instances, agitation of the workpiece W can help improve the coverage of the conductive material 236 within the openings. Furthermore, in other embodiments the steps described above with respect to FIGS. 2E and 2F can be reversed. For example, the workpiece W can be immersed in the conductive material 236 within the slot 234 before the ambient gas within the second chamber 220 is exhausted to create a vacuum in the second chamber 220.

Figure 2G:
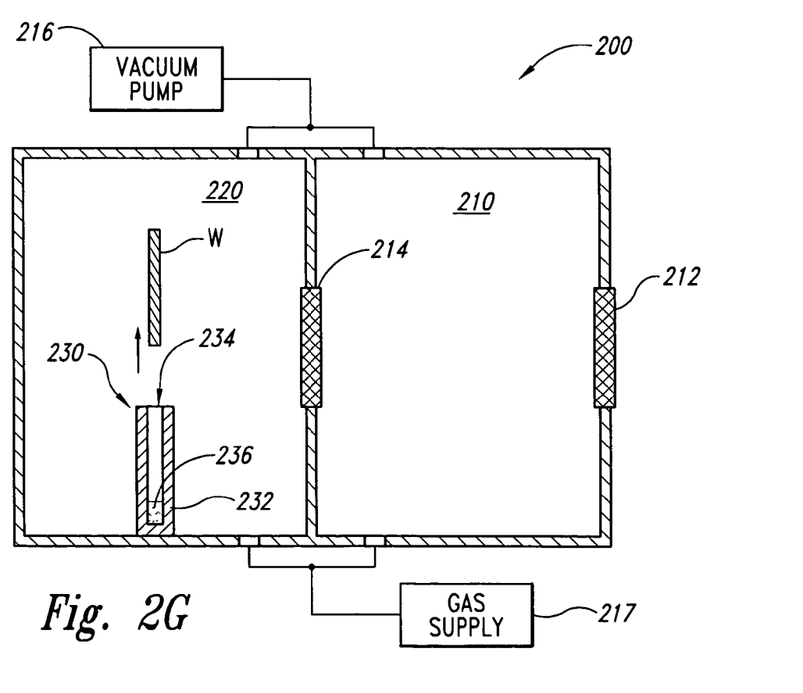
Figure 2H:
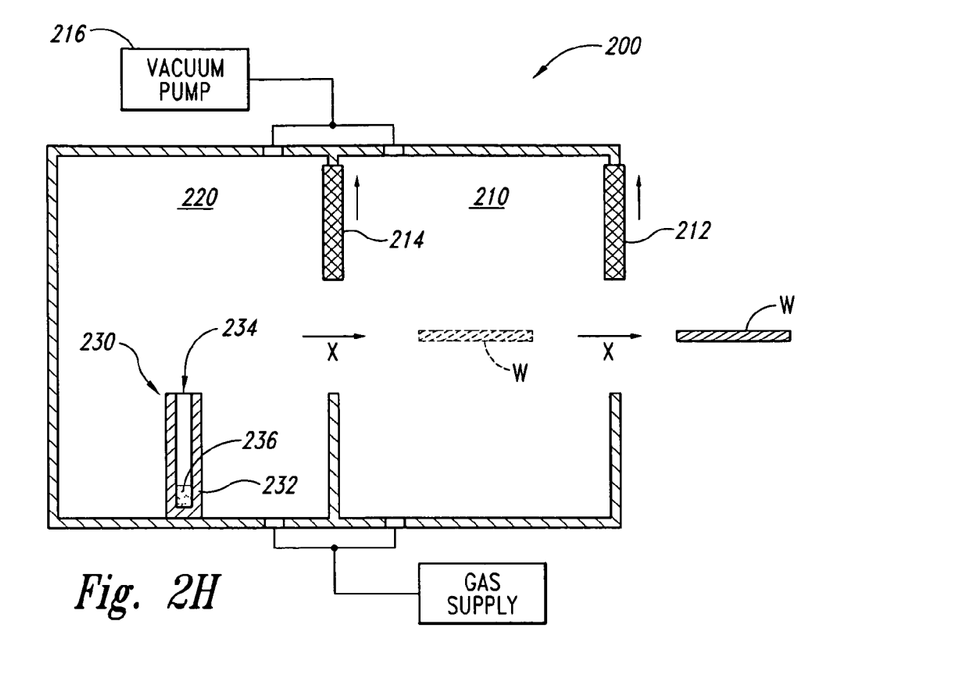

Referring next to FIG. 2G, the workpiece W is removed from the solder reservoir 230 and allowed to cool for a selected period of time within the second chamber 220. Referring to FIG. 2H, the workpiece W is transferred out of the second chamber 220, through the first chamber 210, and out of the first door 212 (as shown by the arrows X) for further processing.

One feature of the system 200 described above for depositing conductive material 236 into openings in a microfeature workpiece W is that the system 200 uses significantly less conductive material than conventional systems described above with reference to FIG. 1. For example, the depth of the slot 234 in the solder reservoir 230 is generally about 200 mm and the width $D_1$ (FIG. 2F) of the slot 234 is about 1 mm. Accordingly, the total volume of the slot 234 is about 40,000 $mm^3$. Furthermore, in many applications the volume of conductive material 236 required for processing can be less than the total volume of the slot 234 because the workpiece W displaces a significant amount of the conductive material 236 within the slot. In contrast, the volume of the solder bath 30 of the conventional system 10 is about 995,500 $mm^3$, and the solder bath 30 is generally kept full or nearly full of conductive material for processing. Thus, the conventional solder bath 30 requires significantly more conductive material 236 than the solder reservoir 230. The system 200 can accordingly be less expensive to operate as compared with the conventional system 10 since substantially less conductive material 236 is necessary for processing. In embodiments using AuSn solder, for example, the system 200 including the solder reservoir 230 requires only several thousand dollars worth of solder for processing a number of workpieces, as compared with the solder bath 30 of FIG. 1 which can require well over $100,000 worth of solder. Furthermore, significant amounts of the conductive material 236 are not wasted after processing because the solder reservoir 230 does not require excessive amounts of conductive material.

Another feature of the system 200 is that the exposed top surface area of the conductive material 236 within the slot 234 of the solder reservoir 230 is significantly less than the exposed top surface area of the solder bath 30. For example, the exposed top surface area of the slot 234 is only about 200 mm$^2$, while the exposed top surface area of the solder bath is over about 52,200 mm (approximately 9 inches by 9 inches square). One advantage of this feature is that reducing the exposed top surface area of the conductive material 236 can significantly reduce dross exposure of the conductive material 236 and oxidation of the workpiece W. This feature can improve the quality of workpieces W processed in the system 200 as compared with conventional systems.

Figure 3:
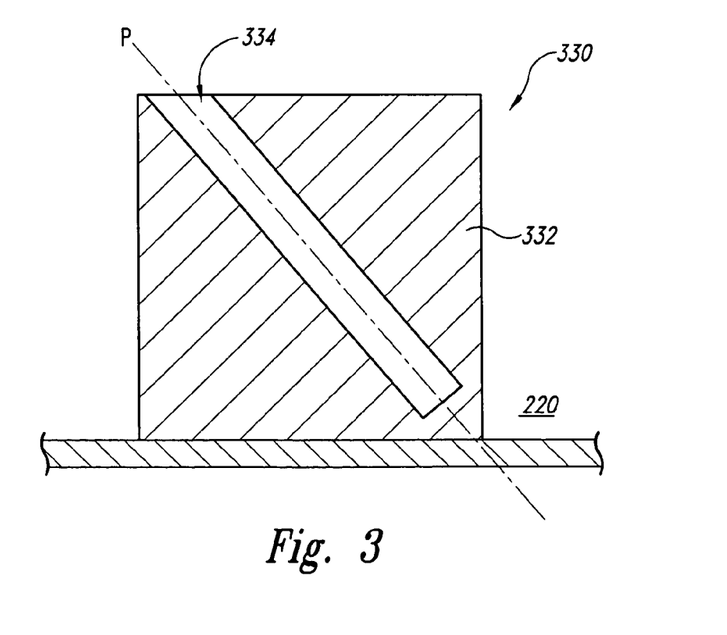
FIG. 3 is a side cross-sectional view of a solder reservoir configured in accordance with another embodiment of the invention.

FIG. 3 is a side cross-sectional view of a solder reservoir 330 in the second chamber 220 in accordance with another embodiment of the invention. The solder reservoir 330 can include a base portion 332 and a slot 334 extending at least partially through the base portion 332. The solder reservoir 330 differs from the solder reservoir 230 described above in that the slot 334 is canted at an angle of about 45 degrees with respect to a horizontal plane extending through the second chamber 220. The canted orientation of the slot 334 can be helpful in removing gas bubbles from the openings in the workpiece W, particularly in embodiments where the openings include through-holes. In other embodiments, the slot 334 can be canted at a different angle with respect to the horizontal plane (e.g., between about 45 degrees to about 90 degrees) or the slot 334 can be canted in a different direction or any suitable angle at which solder does not spill from the slot 334.

From the foregoing, it will be appreciated that specific embodiments of the invention have been described herein for purposes of illustration, but that various modifications may be made without deviating from the invention. For example, the solder reservoir 230 can include additional features, such as one or more heaters to heat the conductive material 236 and/or the workpiece W during processing. Furthermore, the system 200 can include more than one solder reservoir 230 for processing a plurality of workpieces in the second chamber 220. Aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A system for processing microfeature workpieces, the system comprising:
   a processing chamber;
   a transfer chamber adjacent to the processing chamber, wherein the transfer chamber is sized to receive a microfeature workpiece;
   an opening between the transfer chamber and the processing chamber;
   a door positioned to sealably close the opening;
   a vacuum pump operably coupled to the processing chamber and the transfer chamber, wherein the vacuum pump is configured to exhaust ambient gas from the transfer chamber and the processing chamber to create a vacuum within the transfer chamber and the processing chamber, respectively; and
   a solder reservoir in the processing chamber, the solder reservoir including a slot positioned to receive a microfeature workpiece, wherein a width of the slot is less than a depth of the slot, and wherein the slot is canted at an angle between about 45 degrees and 90 degrees with respect to a horizontal plane extending through the processing chamber.

2. The system of claim 1, further comprising a conductive material at least partially filling the slot.

3. The system of claim 2 wherein the conductive material includes AuSn solder, solder, solder alloy, or other conductive materials having lower melting points than silicon.

4. The system of claim 1, further comprising a gas supply operably coupled to the processing chamber, wherein the gas supply is configured to flow an inert gas into the processing chamber to increase the pressure in the processing chamber to a desired pressure.

5. The system of claim 4 wherein the inert gas comprises N$_2$ gas.

6. The system of claim 1 wherein the width of the slot is about 1 mm or less.

7. The system of claim 1 wherein the depth of the slot is about 200 mm and the width is about 1 mm or less.

8. The system of claim 1, further comprising the workpiece, the workpiece including a plurality of openings extending at least partially through the workpiece.

9. The system of claim 1, further comprising an agitation system to vibrate or otherwise move a workpiece in the slot.

10. A system for processing microfeature workpieces, the system comprising:
    a first chamber including a first opening and a second opening, wherein the first chamber is sized to receive a microfeature workpiece;
    a second chamber adjacent to the first chamber and in communication with the second opening;
    a first door positioned to sealably close the first opening and a second door positioned to sealably close the second opening;
    a vacuum pump operably coupled to the first chamber and the second chamber, wherein the vacuum pump is configured to exhaust ambient gas from the first chamber and the second chamber to create a vacuum within the first chamber and the second chamber, respectively;
    a solder reservoir in the second chamber, the solder reservoir including a base portion and a slot extending at least partially through the base portion and positioned to receive a microfeature workpiece, wherein a width of the slot is less than a cross-sectional diameter of the microfeature workpiece; and
    a conductive material at least partially filling the slot, wherein the conductive material includes a top surface, and wherein the slot is canted at an angle between about 45 degrees and 90 degrees with respect to the top surface of the conductive material.

11. The system of claim 10 wherein the conductive material includes AuSn solder, solder, solder alloy, or other conductive materials having lower melting points than silicon.

12. The system of claim 10, further comprising a gas supply operably coupled to the first chamber and the second chamber, wherein the gas supply is configured to deliver an inert gas into the first chamber and the second chamber to increase the pressure in the first chamber and the second chamber, respectively, to a desired pressure.

13. The system of claim 12 wherein the inert gas comprises N$_2$ gas.

14. The system of claim 10 wherein the width of the slot is about 1 mm or less.

15. The system of claim 10 wherein the depth of the slot is about 200 mm and the width of the slot is about 1 mm or less.

16. The system of claim 10, further comprising the workpiece, the workpiece including a plurality of openings extending at least partially through the workpiece.

17. The system of claim 10, further comprising an agitation system to vibrate or otherwise move a workpiece in the slot.

* * * * *